US012744603B2

(12) United States Patent
Alléaume et al.

(10) Patent No.: US 12,744,603 B2
(45) Date of Patent: Sep. 22, 2026

(54) JOINT CLASSICAL AND QUANTUM OPTICAL COMMUNICATIONS

(71) Applicant: INSTITUT MINES TELECOM, Palaiseau (FR)

(72) Inventors: Romain Alléaume, Paris (FR); Yves Jaouen, Paris (FR); Raphaël Aymeric, Paris (FR)

(73) Assignee: INSTITUT MINES TELECOM, Palaiseau (FR)

( * ) Notice: Subject to any disclaimer, the term of this patent is extended or adjusted under 35 U.S.C. 154(b) by 207 days.

(21) Appl. No.: 18/837,860

(22) PCT Filed: Jan. 23, 2023

(86) PCT No.: PCT/EP2023/051487

§ 371 (c)(1),
(2) Date: Aug. 12, 2024

(87) PCT Pub. No.: WO2023/151927

PCT Pub. Date: Aug. 17, 2023

(65) Prior Publication Data

US 2025/0202596 A1 Jun. 19, 2025

(30) Foreign Application Priority Data

Feb. 11, 2022 (EP) .................................... 22305158

(51) Int. Cl.

| | |
|---|---|
| ***H04B 10/70*** | (2013.01) |
| ***H04B 10/548*** | (2013.01) |
| ***H04B 10/61*** | (2013.01) |

(52) U.S. Cl.

CPC ........... *H04B 10/70* (2013.01); *H04B 10/548* (2013.01); *H04B 10/6164* (2013.01); *H04B 10/6165* (2013.01)

(58) Field of Classification Search

CPC .. H04B 10/70; H04B 10/548; H04B 10/6164; H04B 10/6165; H04B 10/64

See application file for complete search history.

(56) References Cited

U.S. PATENT DOCUMENTS 11,444,758 B2 * 9/2022 Li .......................... H04B 10/64
2010/0195831 A1 * 8/2010 Tanaka .................. H04L 9/0858 380/279

(Continued)

FOREIGN PATENT DOCUMENTS

WO 2017148141 A1 9/2017
WO 2019106381 A1 6/2019

OTHER PUBLICATIONS

International Search Report and Written Opinion for PCT Application No. PCT/EP2023/051487, dated Apr. 14, 2023, 11 pages.

(Continued)

*Primary Examiner* — David C Payne
(74) *Attorney, Agent, or Firm* — Dickinson Wright PPLC

(57) ABSTRACT

An optical communication method comprises modulating an optical carrier (OC) by both first and second electrical signals to provide an optical dual signal (S) comprising quantum ($S_q$) and classical ($S_c$) signals, first ($D_q$) and second ($D_c$) data being encoded in the first and second signals respectively; transmitting and receiving said dual optical signal (S) to and from an optical propagation medium; extracting the first and second signals from the received dual signal; compensating in the extracted first signal and from the extracted second signal: a frequency mismatch (Δf) between a central frequency of the optical quantum signal and a local oscillator optical wave (LO); a phase mismatch (Δφ) between the optical carrier and the local oscillator wave; and decoding the first and second data from the compensated first signal and the extracted second signal respectively.

18 Claims, 9 Drawing Sheets

(56) References Cited

U.S. PATENT DOCUMENTS

| | | | | |
|---|---|---|---|---|
| 2012/0177201 | A1* | 7/2012 | Ayling | H04L 9/0858 380/278 |
| 2020/0266978 | A1* | 8/2020 | Li | H04B 10/64 |
| 2021/0105135 | A1* | 4/2021 | Figueroa | H04B 10/70 |
| 2023/0188544 | A1* | 6/2023 | Hunt | H04L 9/0852 726/23 |
| 2023/0305225 | A1* | 9/2023 | Sezer | G02B 6/12004 |

OTHER PUBLICATIONS

European Search Report for EP Application No. 22305158, dated Aug. 1, 2022, 3 pages.

Laudenbach et al., “Pilot-assisted Intradyne reception for high-speed continuous-variable quantum key distribution with true local oscillator,” ArXiv:1712.10242v3 [quant-ph], Jan. 17, 2019, 9 pages.

Milovancev et al., “High Rate CV-QKD Secured Mobile WDM Fronthaul for Dense 5G Radio Networks,” AIT Austrian Institute of Technology, Apr. 9, 2021, 18 pages.

* cited by examiner

JOINT CLASSICAL AND QUANTUM OPTICAL COMMUNICATIONS

CROSS-REFERENCE TO RELATED APPLICATION(S)

This present application is a national stage application of International Patent Application No. PCT/EP2023/051487, filed Jan. 23, 2023, which claims priority to European Patent Application No. 22305158.2, filed Feb. 11, 2022, the disclosures of which are hereby incorporated by reference in their entireties.

TECHNICAL FIELD

The disclosure generally relates to an optical communication method, corresponding transmitter, receiver and system.

A preferred application of the present disclosure is quantum key distribution using continuous variables (CV-QKD).

BACKGROUND

F. Laudenbach et al. in a paper entitled "Pilot-assisted intradyne reception for high-speed continuous-variable quantum key distribution with true local oscillator" published in *Quantum,* 2019, vol. 3, p. 193 describes an optical communication method via an optical propagation medium, comprising the following steps:

- modulating an optical carrier by both a first electrical signal and a second electrical signal, in order to provide an optical dual signal comprising an optical quantum signal resulting from the modulation of the optical carrier by the first electrical signal and an optical classical signal resulting from the modulation of the optical carrier by the second signal, first data being encoded in the first electrical signal;
- transmitting the dual optical signal on the optical propagation medium; receiving the dual optical signal from the optical propagation medium;
- extracting the first electrical signal and the second electrical signal from the received dual signal using a coherent receiver comprising a local oscillator;
- compensating in the extracted first signal and from the extracted second signal: a frequency mismatch between a central frequency of the optical quantum signal and a local oscillator optical wave provided by the local oscillator; and/or a phase mismatch between the optical carrier and the local oscillator wave; and
- decoding the first data from the compensated first signal.

In the above paper, the second signal is a pilot tone that is frequency-locked and phase-locked to the optical carrier of the transmitter.

To estimate the phase of the optical carrier, the receiver measures both quadratures (I, Q) of the received pilot tone using coherent detection. Based on this measurement, the phase mismatch between the optical received optical pilot tone and the optical local oscillator of the coherent receiver is estimated and compensated on the received quantum signal to restore a posteriori the coherence before demodulating the quantum data.

According to this technique, the pilot tone is obtained by modulating the optical carrier by a reference cosine wave, thereby representing a fixed symbol which is static in phase, serving as a dedicated reference for demodulating the quantum signal.

This technique thus requires a dedicated pilot tone and additional resources to process the pilot tone to perform carrier recovery in frequency and/or in phase.

Another technique may consist in transmitting the classical data and the quantum data over two separate optical fibers respectively, for instance by using dedicated fiber links for QKD. This technique is spectrally efficient in that the signals carrying the classical and quantum data cannot interfere as they propagate over distinct optical media. However, this solution is not appropriate for reducing the complexity and the cost of the communication system, in particular at the receiver side.

As a result, there exists a need for simultaneous communication of quantum data and classical data on the same optical propagation medium.

SUMMARY

Thus, there is a provided an optical communication method via an optical propagation medium, comprising the following steps:

- modulating an optical carrier by both a first electrical signal and a second electrical signal, in order to provide an optical dual signal comprising an optical quantum signal resulting from the modulation of the optical carrier by the first electrical signal and an optical classical signal resulting from the modulation of the optical carrier by the second signal, first data being encoded in the first electrical signal;
- transmitting said dual optical signal on the optical propagation medium;
- receiving said dual optical signal from the optical propagation medium;
- extracting the first electrical signal and the second electrical signal from the received dual signal using a coherent receiver comprising a local oscillator;
- compensating in the extracted first signal and from the extracted second signal: a frequency mismatch between a central frequency of the optical quantum signal and a local oscillator optical wave provided by the local oscillator; and/or a phase mismatch between the optical carrier and the local oscillator wave; and
- decoding the first data from the compensated first signal;
- characterized in that second data are encoded in the electrical second signal and in that said method further comprises decoding the second data from the extracted second signal.

Thus, according to the disclosure, the second signal is a data-carrying signal that essentially serves two purposes simultaneously. It not only carries an effective message to be delivered to the receiver, but it also conveys the frequency and/or phase information of the optical carrier from which the quantum signal originates. This information serves to estimate the frequency and/or phase mismatch which is then compensated in the quantum signal.

The inventors demonstrated that, surprisingly, the second signal as a classical data-carrying signal can provide a solid estimate for the frequency and phase estimation to perform carrier recovery. In particular, when the disclosure is used for CV-QKD, the inventors demonstrated that the second signal does not induce excess noise beyond the null key rate threshold. The key rate corresponds to the number of secret bits per symbols sent. The excess noise is directly linked to the performance of QKD, i.e. to the key rate.

Within the context of the present disclosure, it is considered that the excess noise is the amount of noise in excess of the shot noise arising from the photo-detection of photons due to the discrete nature of photons.

The present disclosure may further include one or several of the following optional features, according to any combination that is technically possible:

- the modulation step further comprises polarization multiplexing, so that the optical quantum signal and the optical classical signal have orthogonal polarizations relative to each other;
- the modulation step comprises:
  - modulating the optical carrier by both the first electrical signal and the second electrical signal, in order to provide an intermediate optical signal comprising a classical signal resulting from the modulation of the optical carrier by the first electrical signal and comprising the classical signal resulting from the modulation of the optical carrier by the second electrical signal; and
  - attenuating an optical power of the classical signal resulting from the modulation of the optical carrier by the first electrical signal, in order to obtain the quantum signal;
- the optical quantum signal and the optical classical signal are frequency multiplexed;
- the first and second electrical signals have respective disjoint bandwidths;
- the first and second electrical signals have respective central frequencies separated by a predetermined frequency offset, preferably greater than 2 GHz;
- the optical classical signal and the optical quantum signal are both spectrally arranged either below or above the optical carrier;
- the method further comprises compensating the frequency offset before estimating the frequency mismatch and/or estimating the phase mismatch;
- the first data and the second data are encoded by m-Quadrature Phase Shift Keying and wherein the phase mismatch and/or the frequency mismatch is determined by the Viterbi & Viterbi $m^{th}$ power algorithm, preferably wherein m=4;
- the method further comprises:
  - before modulating the optical carrier, performing a digital-to-analogue conversion of the first electrical signal and the second electrical signal;
  - after extracting the first and second electrical signals from the received dual signal, performing an analogue-to-digital conversion of the extracted first signal and the extracted second signal; and
  - compensating a residual frequency mismatch and/or a residual phase mismatch in the extracted first signal wherein said residual frequency mismatch results from a clock time jitter between the digital-to-analogue conversion and the analogue-to-digital conversion and wherein said phase mismatch results from an optical path difference between the classical signal and the quantum signal;
- the method further comprises, prior to compensating said residual frequency mismatch and/or said residual phase mismatch, sending to the receiver a set of reference data selected from the first data separately from the quantum signal;
- compensating said residual frequency mismatch comprises:
  - estimating an excess noise by comparing the received reference quantum data with the corresponding first data; and
  - determining the residual frequency mismatch iteratively so that said excess noise is minimized;
- compensating said residual phase mismatch comprises:
  - calculating a covariance between the decoded first data and the received reference quantum data; and
  - determining the phase mismatch iteratively so that said covariance is maximized.
- the second data contains the reference data, so that the reference data is sent from the emitter to the receiver along with the second data;
- the optical propagation medium is a single optical fiber, preferably a single-mode optical fiber.

Another object of the present disclosure is a transmitter for optical communication, comprising:

- a modulation unit for modulating an optical carrier by both a first electrical signal and a second electrical signal, first data being encoded in the first electrical signal, in order to provide an optical dual signal comprising an optical quantum signal resulting from the modulation of the optical carrier by the first electrical signal and an optical classical signal resulting from the modulation of the optical carrier by the second electrical signal;
- an optical output for transmitting the optical dual signal to an optical propagation medium;
- characterized in that it further comprises a signal generator for generating the second electrical signal with second data encoded therein.

Another object of the present disclosure is a receiver for optical communication, comprising:

- an optical input for receiving, from an optical propagation medium, a dual optical signal comprising an optical quantum signal resulting from a modulation of an optical carrier by a first electrical signal and a classical optical signal resulting from a modulation of the optical carrier by a second electrical signal, first data being encoded in the first electrical signal;
- a coherent demodulation unit and a local oscillator for extracting the first and second electrical signals from the received dual signal;
- a compensator for compensating, in the extracted first electrical signal and from the extracted second electrical signal, a frequency mismatch between a central frequency of the optical quantum signal and a local oscillator optical wave provided by the local oscillator; and/or a phase mismatch between the optical carrier and the local oscillator wave; and
- a first processing unit for processing the compensated first signal to obtain the first data ($D_q$);
- characterized in that second data are encoded in the second signal and in that it further comprises a second processing unit for processing the extracted second signal to provide the second data.

Another object of the present disclosure is a system for optical communication, characterized in that it comprises a transmitter according to the disclosure as described above, a receiver according to the disclosure as described above, and an optical propagation medium connecting the transmitter to the receiver.

The optical propagation medium may be a single optical fiber, preferably a single-mode optical fiber.

BRIEF DESCRIPTION OF DRAWINGS

The accompanying drawings, which are incorporated in and constitute a part of this specification, illustrate various embodiments of the disclosure and, together with the general description of the disclosure given above, and the detailed description of the embodiments given below, serve to explain the embodiments of the disclosure.

DETAILED DESCRIPTION

Figure 1:
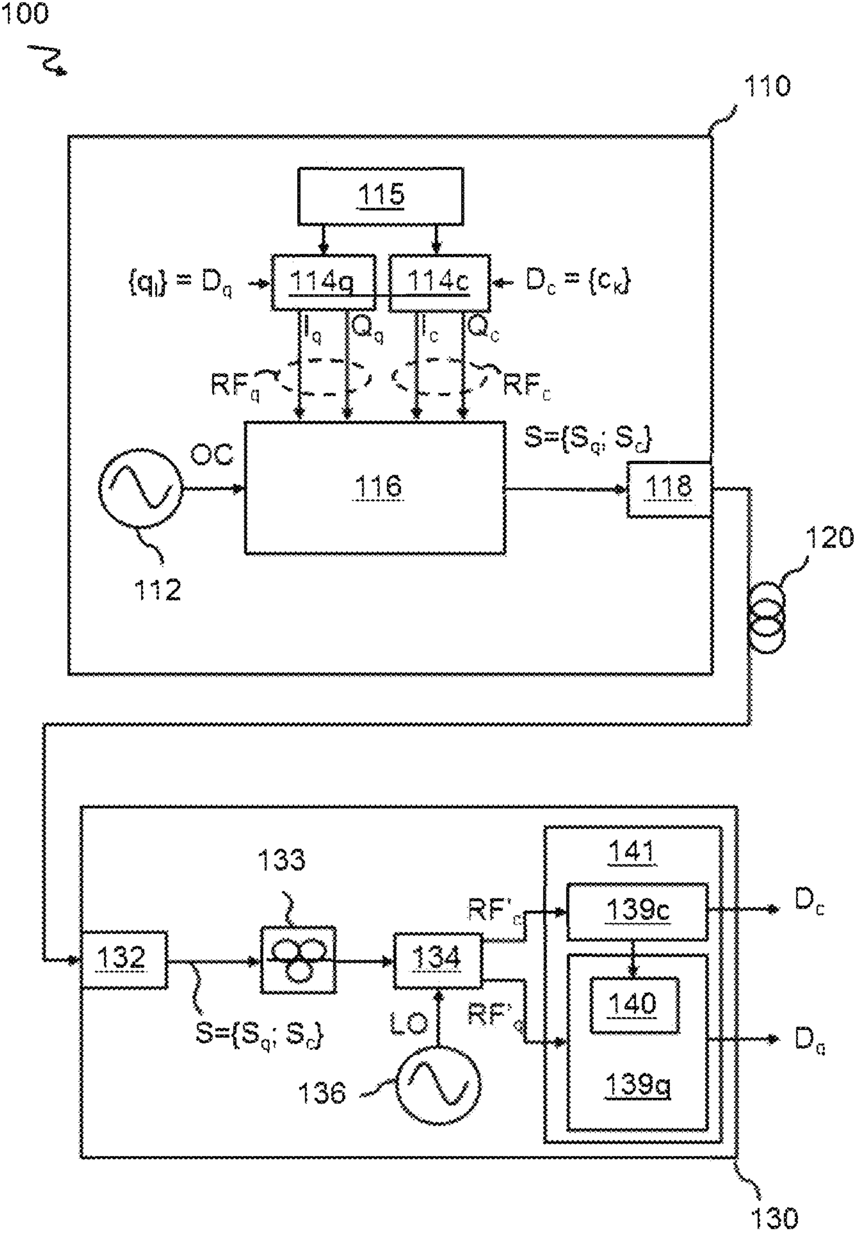
FIG. 1 depicts an example of a coherent optical communication system according to the disclosure.

An example of a coherent optical communication system 100, wherein the present disclosure is implemented, will now be described in reference to FIG. 1.

The system 100 comprises a transmitter 110, a receiver 130 and an optical propagation medium 120 connecting the transmitter 110 to the receiver 130.

Preferably, the optical propagation medium 120 is a single optical fiber, preferably a single-mode fiber adapted for long-haul transmissions, for instance over distances of about 15-50 km.

The transmitter 110 further comprises an optical carrier generator 112 for generating an optical carrier OC. For example, the optical carrier OC is a continuous lightwave. Preferably, the optical carrier generator 112 comprises a laser, for instance, configured for emitting a continuous lightwave at an emission wavelength set around 1550 nm, and with a linewidth comprised between 100 Hz and 100 kHz.

For example, the emission wavelength may set to the central wavelength of a standard DWDM ("Dense Wavelength Division Multiplexing") channel, e.g. said channel being selected in the C-band.

For example, the linewidth of the laser may be equal to about 100 kHz, so that standard lasers for telecommunication can be used to reduce costs.

Thus, the optical carrier OC may be the continuous lightwave emitted by the laser.

Alternatively, the optical carrier OC may be an optical pulse train comprising a series of optical pulses at a reference pulse frequency (e.g. 250 MHz). This pulse train may be obtained by modulating a continuous lightwave (for example emitted by a laser as described above) in amplitude by a periodic signal, such as a cosine wave, at the reference pulse frequency, for instance by using a Mach-Zehnder pulse carver. The resulting amplitude-modulated optical carrier (i.e. pulse train) further improves the communication security in comparison with a continuous lightwave optical carrier.

The transmitter 110 further comprises a first signal generator $\mathbf{114}_q$ for providing a first electrical signal $RF_q$ in which first data $D_q$ is encoded and a second signal generator $\mathbf{114}_c$ for providing a second electrical signal $RF_c$ in which second data De is encoded. For example, the first and second electrical signals $RF_q$, $RF_c$ are analogue.

The data $D_q$, De comprise respective sequences of symbols $\{q_l\}$, $\{c_k\}$, which are respectively referred to, in the following, as quantum data $D_q$ and classical data $D_c$ (as they are intended to be sent by respectively a quantum signal $S_q$ and a classical signal $S_c$).

For instance, in the context of Quantum Key Distribution, the quantum data $D_q$ comprise at least one cryptographic key that may be used for encrypting communications between the transmitter 110 and the receiver 130. For example, the classical data De is encrypted by the cryptographic key.

The electrical signals $RF_q$, $RF_c$ then have respective modulation rates, i.e. a respective number of symbols per second. In particular, each symbol $q_l$, $c_k$ lasts for a symbol period equal to the inverse of the respective modulation rate. Preferably, the modulation rate of the first electrical signal $RF_q$ is lower than the modulation rate of the second electrical signal $RF_c$. For example, the modulation rate of the first electrical signal $RF_q$ may be equal to 250 Mbaud (i.e. 250 Mega symbols per second), and the modulation rate of the second electrical signal $RF_c$ may be equal to Gbaud (i.e. 4 Giga symbols per second).

The electrical signals $RF_q$, $RF_c$ also have respective frequency bandwidths which are preferably disjoint, i.e. do not overlap. For example, each electrical signal $RF_q$, $RF_c$ comprises a modulated radiofrequency having a central frequency. Thus, each of the electrical signals $RF_q$, $RF_c$ has an electrical bandwidth with a respective central frequency located at the middle of the corresponding bandwidth.

The central frequencies of the two electrical signals $RF_q$, $RF_c$, are then separated by a frequency offset $f_s$ greater than the sum of half of the bandwidths of the electrical signals $RF_q$, $RF_c$, so that there is no spectral overlap between both electrical signals (i.e. their respective bandwidths are disjoint). Preferably, the frequency offset $f_s$ is greater than 2 GHz. In the described example, the central frequency of the second electrical signal $RF_c$ is 4 GHz and the central frequency of the second electrical signal $RF_q$ is 1 GHz. In this case, the frequency offset $f_s$ is therefore equal to 3 GHz.

Each symbol $c_k$, $q_l$ belongs to a respective modulation alphabet $A_c$, $A_q$ associated with the modulation scheme applied to the electrical signals $RF_c$, $RF_q$ respectively. For example, the electrical signals $RF_q$, $RF_c$ may be both Quadrature Phase Shift Keying (QPSK) signals. In particular, in case of QPSK signals, the electrical signals $RF_q$, $RF_c$ may be provided by the signal generators $\mathbf{114}_q$, $\mathbf{114}_c$ as in phase and quadrature components, noted $I_q$, $Q_q$ and $I_c$, $Q_c$, respectively.

However, other digital modulation formats may be considered to encode the information for the classical data and/or the quantum data. More generally, higher-order modulation schemes, such as the 16-PSK, 32-PSK, 64-PSK or 16-QAM, 32-QAM, 64-QAM ("Quadrature Amplitude Modulation") may be used, whereby data is encoded into discrete changes of the phase of the carrier at time instants equal to multiples of the symbol period. The multilevel QAM modulation schemes are particularly well suited to improve the detection performance as the modulation symbols tend to follow a Gaussian distribution.

Preferably, QAM is used for transmitting the quantum data. Using higher order modulation schemes (up to 64-QAM) is particularly well adapted to enhance the security of quantum data as well as the key rate for Quantum Key Distribution applications.

Preferably, QPSK is used for transmitting the classical data, since it is particularly well suited to obtain the phase of the received classical signal with precision. Other modulation schemes may also be used provided that phase recovery may be performed with sufficient accuracy.

Furthermore, the modulation rates indicated above are for illustration purposes only and may be adapted, for instance according to the modulation scheme under consideration and/or the propagation constraints such as noise levels, and/or the application considered for transmission of quantum data (for instance Quantum Key Distribution).

Each signal generator 114$_q$, 114$_c$ may comprise a filter configured for filtering the respective electrical signal $RF_q$, $RF_c$, for instance to limit inter-symbol interference (ISI) and/or to limit the amount of noise. For example, each filter may be an RRC filter (Root-Raised Cosine), preferably with a roll-off factor of 0.1.

For example, the signal generators 114$_q$, 114$_c$ may be implemented by respective arbitrary waveform generators (AWG). In this case, the electrical signals $RF_q$, $RF_c$ are digitally generated and filtered when the filters are implemented by the AWGs. The AWGs further comprise respective digital-to-analogue converters to provide the electrical signals $RF_q$, $RF_c$ in analogue form. The transmitter 110 may further comprise a synchronizer 115 connected to the two AWGs 114$_q$, 114$_c$, for triggering them by a common time reference, so that the electrical signals $RF_c$ and $RF_q$ are synchronized. For example, the synchronizer 115 may be an arbitrary function generator (AFG).

The transmitter 110 further comprises a modulation unit 116 configured for modulating the optical carrier OC by both electrical signals $RF_q$, $RF_c$, in order to provide an optical dual signal S. The optical dual signal S therefore comprises an optical quantum signal $S_q$ resulting from the modulation of the optical carrier OC by the first electrical signal $RF_q$ and an optical classical signal $S_c$ resulting from the modulation of the optical carrier OC by the second signal $RF_c$.

The modulation unit 116 is configured such that the signal $S_q$ is a quantum signal and the signal $S_c$ is a classical signal. In the present example where the optical carrier OC is a continuous lightwave, the optical signal $S_q$ is quantum when each symbol period comprises a mean number of photons lower than 20, preferably 10, more preferably 5 or even 2.

If the optical carrier OC is not a continuous lightwave but an optical pulse train, each symbol may be associated with one or more light pulses. In that case, the optical signal $S_q$ is quantum when the one or more light pulses associated with each symbol period comprises a mean number of photons lower than 20, preferably 10, more preferably 5 or even 2.

Thus, regardless of the nature of the optical carrier OC, i.e. continuous lightwave or optical pulse train, the mean number of photon per symbol is lower than 20, preferably 10, more preferably 5 or even 2 to put the optical signal in a quantum regime.

Both optical signals $S_c$, $S_q$ are inherently frequency-locked and phase-locked to each other, given that they both share the same optical carrier OC originating from the optical carrier generator 112. In other words, the optical classical signal $S_c$ and the optical quantum signal $S_q$ have, at each time, the same frequency and phase information corresponding to the frequency and phase of the optical carrier OC.

Preferably, the modulation unit 116 is configured such that the optical signals $S_c$, $S_q$ have respective polarization orthogonal relative to each other, so that the optical signals $S_c$, $S_q$ are polarization multiplexed. Furthermore, when the bandwidths of the electrical signals $RF_q$, $RF_c$ are disjoint, the optical signals $S_q$, $S_c$ also have disjoint bandwidths, so that the optical signals $S_c$, $S_q$ are frequency multiplexed. Frequency and/or polarization multiplexing allow to reduce the cross-talk between the optical signals $S_q$, $S_c$.

The transmitter 110 further comprises an optical output 118 for transmitting the optical dual signal S to the optical propagation medium 120.

The receiver 130 comprises an optical input 132 for receiving the optical dual signal S from the optical propagation medium 120.

The receiver 130 further comprises an optical local oscillator 136 configured for generating an optical local oscillator wave LO. Preferably, the optical local oscillator 136 is a coherent optical light source, such as a laser diode. For instance, the laser diode may be configured to emit a continuous-wave light at a wavelength equal to 1547.762 nm and with a low linewidth equal to 100 Hz.

The receiver 130 may further comprise an optical polarization controller 133 for realigning the optical signals $S_q$, $S_c$ on their respective polarizations.

The receiver 130 further comprises a demodulation unit 134 configured for extracting from the received optical dual signal S signals $RF'_q$, $RF'_c$ corresponding respectively to the signals $RF_q$, $RF_c$. This extraction is carried out through coherent detection using the local oscillator wave LO. Thus, the demodulation unit 134 is referred to as a coherent demodulation unit.

In that regard, the receiver 130 is a coherent receiver. For example, the coherent receiver is sensitive to the amplitude and to the phase of the optical dual signal S sent by the transmitter 110. For that purpose, the coherent receiver 130 uses a frequency and phase reference provided by the local oscillator wave LO used as a reference to extract the signals sent by the transmitter 110. For securing communications between the transmitter and the receiver, the local oscillator wave LO is generated by the receiver 130 but is not transmitted over the optical fiber 120 to avoid any risk of eavesdropping for getting the phase and frequency of the local oscillator wave LO.

In theory, the local oscillator wave LO should to be approximately frequency-locked and/or phase-locked to the optical carrier OC. In practice, there may be a phase mismatch $\Delta\varphi$ and/or frequency mismatch $\Delta f$ between the optical carrier OC and the local oscillator wave LO, for example varying in time.

The receiver 130 further comprises a digital processing module 141 for processing the electrical signals $RF'_q$, $RF'_c$ extracted by the demodulation unit 134.

For instance, the signal processing module 141 comprises first and second processing units 139$_q$, 139$_c$ configured for respectively processing the extracted signals $RF'_q$, $RF'_c$, so as to respectively obtain the data $D_q$, $D_c$.

In particular, the first processing unit 139$_q$ comprises a compensator 140 for compensating, in the extracted first signal $RF'_q$, the phase mismatch $\Delta\varphi$ and/or frequency mismatch $\Delta f$, using the extracted second signal $RF'_c$. The first processing unit 139$_q$ is then configured for providing the data $D_q$ from the compensated first signal $RF'_q$.

The fact that the two electrical signals $RF_q$, $RF_c$ are synchronized for instance by using the synchronizer 115 ensures that the frequency and/or phase mismatch determined from the second extracted signal $RF'_c$ is applied at the right time on the first extracted signal $RF'_q$. Thus, phase and frequency recovery can be performed on the classical signal $RF'_c$, as phase and frequency recovery cannot be performed directly on the quantum signal $RF'_q$ used for instance for quantum key distribution.

For example, the quantum data $D_q$ and the classical data $D_c$ are sent simultaneously from the transmitter 110 to the receiver 130 over a certain period of time, during which the received data are acquired and processed by the digital processing module 141. The period of time of referred to as a measurement period.

Figure 2:
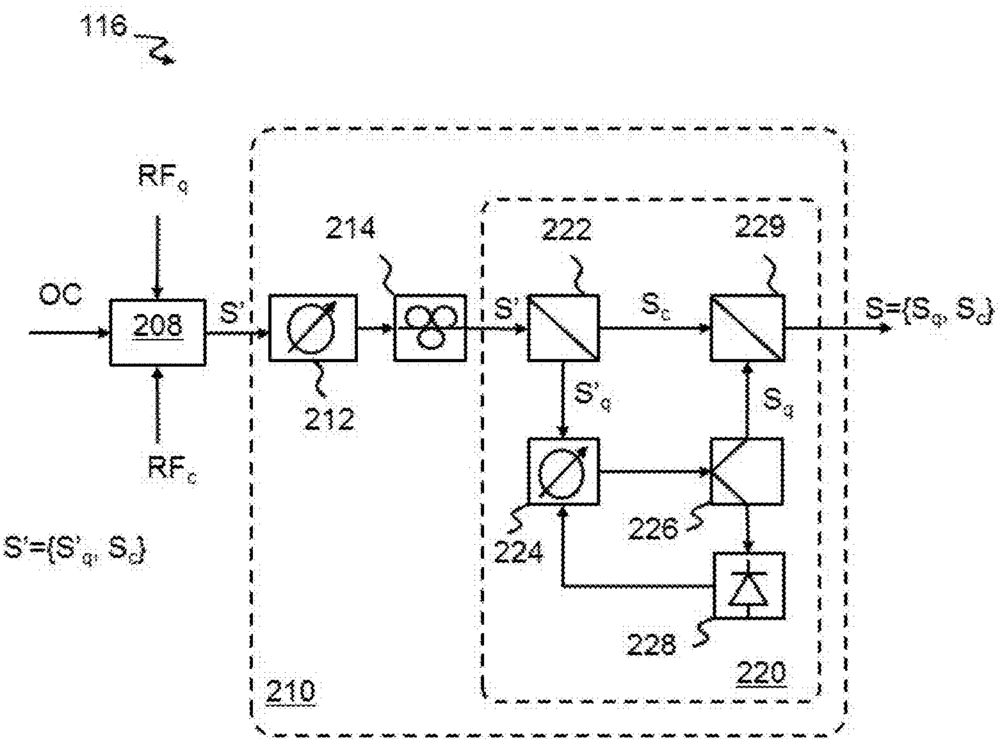
FIG. 2 depicts an embodiment of a modulation unit of a transmitter of the optical communication system of FIG. 1.

Referring to FIG. 2, an example of modulation unit 116 will now be described.

The modulation unit 116 comprises an optical modulator 208 for modulating the optical carrier OC by both the first and second electrical signals $RF_q$, $RF_c$ so as to provide an intermediate optical signal S'.

At the output of the optical modulator 208, the intermediate optical signal S' comprises a classical signal $S'_q$ resulting from the modulation of the optical carrier OC by the first electrical signal $RF_q$ and the classical signal $S_c$ resulting from the modulation of the optical carrier OC by the second electrical signal $RF_c$.

Preferably, the optical modulator 208 is a quadrature modulator also referred to as an I/Q modulator, configured for receiving each of the electrical signals $RF_q$, $RF_c$ in the form of their two components $I_q$, $Q_q$ and $I_c$, $Q_c$ and outputting the optical intermediate signal S'

Figure 3:
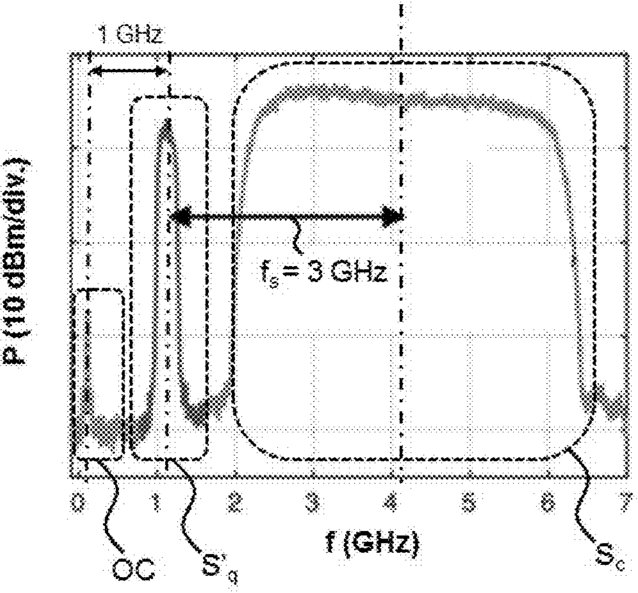
FIG. 3 depicts an optical spectrum generated by the modulation unit of FIG. 2.

FIG. 3 is a diagram depicting an example of the optical spectrum of the intermediate optical signal S' measured directly at the output of the optical modulator 208.

On this diagram, the optical power, expressed in dBm, is represented on the vertical axis (10 dBm per division) as a function of the frequency noted f, expressed in GHz, as represented on the horizontal axis. It is noted that this frequency f is relative to the frequency of the optical carrier OC. Thus, the optical spectrum of the intermediate optical signal S' is shown relatively to the optical carrier OC.

According to this example, the carrier frequency of the signal $S_c$ is located at about 4 GHz from the frequency of the optical carrier OC, while the carrier frequency of the signal $S'_q$ is located at 1 GHz from the frequency of the optical carrier OC.

Therefore, the two optical signals $S'_q$, $S_c$ are separated spectrally by a frequency offset equal to $f_s$=3 GHz. More precisely, this frequency offset $f_s$ is determined between a central frequency of the bandwidth of the modulated classical signal $S_c$ (e.g. equal to about 4 GHz) and a peak frequency of the signal $S'_q$ (e.g. at a about 1 GHz). Thanks to this frequency offset $f_s$, there is no spectral overlap between the two optical signals $S_c$, $S'_q$.

Preferably, the two optical signals $S'_q$, $S_c$ are both spectrally arranged either below or above the optical carrier OC, so that the two optical signals $S'_q$, $S_c$ are located on a same side of the optical carrier OC, for instance, on its right hand side as depicted in FIG. 3. In other words, the frequencies of the signals are all located above or below the central frequency of the optical carrier CO, without any overlap with the optical carrier.

In particular, this arrangement enables to increase the modulation rate of the optical signals $S'_q$, $S_c$, without spectrally overlapping with the optical carrier OC. This arrangement is particularly advantageous over the setup proposed by Laudenbach et al. in the paper referenced above, wherein the optical carrier is spectrally arranged between the pilot tone and the quantum signal, so that the pilot tone and the quantum signal are separated from the optical carrier by 1 GHz only. This setup greatly limits the system bandwidth, since even if the optical carrier is suppressed, a residue of the optical carrier still remains, which may cause interferences.

Back to FIG. 2, in order to carry out polarization multiplexing, the optical modulator 208 is configured for placing the optical signals $S'_q$, $S_c$ on two distinct optical polarizations, preferably orthogonal to each other. For that purpose, the optical modulator 208 is preferably a dual-polarization modulator. In the described example where the optical signals $S_c$, $S'_q$ are decomposed into their IQ components, the optical modulator 208 is a dual-polarization IQ modulator.

The transmitter 110 further comprises a power controller 210 for setting a power of at least the signal $S'_q$.

For example, the power controller 210 may comprise a global attenuator 212, preferably variable, for attenuating the intermediate optical signal S' as a whole and in particular the signal $S_c$, in order to set a power of the signal $S_c$ so as to generate minimal leakage noise on the other signal $S'_q$, while maintaining reliable classical communication. For example, the global attenuator 212 is configured to set the power of the signal $S_c$ to $P_c$=−31 dBm.

In the present embodiment, this power level was found to be optimal in that it limits an excess noise factor, while reducing the amount of noise in the estimated frequency mismatch and/or phase mismatch. The excess noise factor represents the noise contributions which are greater than the quantum noise associated with the local oscillator. However, this power level may be further adjusted to further optimize the transmission performances, for instance in the case of quantum key distribution.

Preferably, the power controller 210 comprises a polarization controller 214 configured for realigning the optical signals $S'_q$, $S_c$ on their respective polarizations, for example after attenuation by the global attenuator 212.

In the present example, the polarization controller 214 is designed so that it can be adjusted manually. In other embodiments, the polarization controller 214 may be replaced by an Automatic Polarization Controller (APC) for automatically controlling the polarization of the optical signals $S'_q$, $S_c$, so that at the output of the APC, these signals $S'_q$, $S_c$ are at substantially constant polarization at all times, for instance at an orthogonal polarization.

The power controller 210 may further comprise a selective attenuator 220 for attenuating a power of the signal $S'_q$, while keeping the optical power of the other signal $S_c$ substantially unchanged. The attenuation of the power of the signal $S'_q$ is intended to bring the classical signal $S'_q$ into a quantum regime, so as to form a quantum signal $S_q$ as defined previously. For example, the attenuation of the selective attenuator 220 is set so that the number of photons per symbol period is less than 10, preferably less than 5 or more preferably less than 2. As a result, the attenuated signal $S_q$ is said to be a quantum signal or in a quantum regime.

For example, the selective attenuator 220 may comprise a polarizing beam splitter 222 configured for receiving the intermediate optical signal S', preferably after the polarization controller 214, and for separating the signals $S_c$, $S'_q$ based on their respective polarizations.

The selective attenuator 220 may further comprise an attenuator 224, preferably variable, configured for attenuating the power of the separated signal $S'_q$ so as to become the quantum signal $S_q$.

Optionally, the attenuator 224 may be controlled. In this case, the selective attenuator 220 may further comprise a beam splitter 226 configured for separating a known portion of the power of the quantum signal $S_q$ and an optical power meter 228 configured for measuring the power of the separated portion and for controlling, from the measured power, the attenuator 224 so as to set precisely the power of the signal $S_q$ provided by the beam splitter 226. The beam splitter 226 is preferably a 50:50 power splitter, so that half of the incoming power is used for controlling the attenuator 224.

The selective attenuator 220 may then further comprise a second polarizing beam splitter 229 configured for combining the classical signal $S_c$ with the quantum signal $S_q$ to obtain the optical dual signal S.

The spectrum of the optical dual signal S at the output the second polarizing beam splitter 229 corresponds to the spectrum described in reference to FIG. 3, except that the power of the signal $S'_q$ has been reduced to provide the optical quantum signal $S_q$ and that the power of the optical classical signal $S_c$ may have been modified by the global attenuator 212.

A preferred embodiment of the demodulation unit 134 will now be described in reference to FIG. 4.

The demodulation unit 134 may comprise an optical mixing device 404 (or optical combiner) configured for mixing (or combining) the optical dual signal S with the local oscillator wave LO, in order to obtain the optical signals $S_c$, $S_q$.

Preferably, in particular when the signals $S_c$, $S_q$ use QPSK or QAM modulation, the mixing device 404 is configured for providing the I and Q components for each of the signals $S_c$, $S_q$, i.e. respectively $I_c$, $Q_c$ and $I_q$, $Q_q$. For instance, the mixing device 404 may be a dual-polarization phase-diversity demodulator.

In the present embodiment, the optical mixing device 404 comprises a polarizing beam splitter (not represented) for separating the two signals $S_c$, $S_q$ of the incoming dual optical signal S based on their respective polarizations. In addition, the optical mixing device 404 further comprises a beam splitter (not represented) for dividing the local oscillator wave LO into two equal parts, one for the classical signal $S_c$ and one for the quantum signal $S_q$.

The demodulation unit 134 may further comprise high-speed photo-receivers 406, 407 for converting the optical components $I_c$, $Q_c$ to electrical signals. Preferably, these photo-receivers 406, 407 have a large bandwidth adapted to detect the optical classical signal $S_c$.

For instance, this bandwidth is equal to 43 GHz for detecting the classical data at a modulation rate of 4 GBaud, taking into account the frequency shift of the signal bandwidth compared to the optical carrier OC.

For instance, on the spectra illustrated in FIG. 3, the classical signal $S_c$ has a maximal frequency of about 6.5 GHz, so that it is sufficient to provide a bandwidth of about 20 GHz or less to minimize costs.

More generally, the bandwidth of the photo-receivers 406, 407 is selected as a function of the maximal symbol rates to be transmitted, knowing that the higher the bandwidth is, the higher the symbol rates can be.

The receiver 130 further comprises quantum photo-receivers 408, 409 for converting the optical $I_q$ and $Q_q$ components of the received optical quantum signal $S_q$ in the electrical domain. Preferably, the quantum photodetectors are low-noise and low-bandwidth photodetectors for limiting the amount of noise added to the quantum data.

For instance, the bandwidth of these photodetectors is equal to 350 MHz, which is in line with the quantum data modulation rate of 100 MBaud as set at the transmitter 110.

The quantum photo-receivers 408, 409 are low-noise, in that they provide a low level of electronic noise, compared to the shot noise power that can be observed on the receivers by shining the local oscillator on the photo-receiver. Hence, each quantum photo-receiver allows to operate in a regime where the quantum noise (shot noise) prevails amongst all other sources of noise. Such quantum photo-receivers are often referred to as "shot-noise-limited".

The demodulation unit 134 may further comprise an analogue to digital converter (ADC) 410 configured for converting the analogue $I_c$, $Q_c$ and $I_q$, $Q_q$ components into digital form, noted $RF'_c$, $RF'_q$ respectively. For example, the ADC 410 may be a digitizing oscilloscope set to sample the signals $I_c$, $Q_c$, $I_q$, $Q_q$ at a sufficiently high sampling rate, so that the signals $S_c$, $S_q$ can be detected (recorded) simultaneously. For instance, the oscilloscope 410 may be configured to operate at a sampling rate of 20 Gs/s by blocks of 10 Mega samples corresponding to $1.25\times10^5$ quantum symbols and $2\times10^5$ classical symbols per block. For example, the oscilloscope 410 is adapted to digitize the analogue signals with an effective number of bits of about 6.

Figure 4:
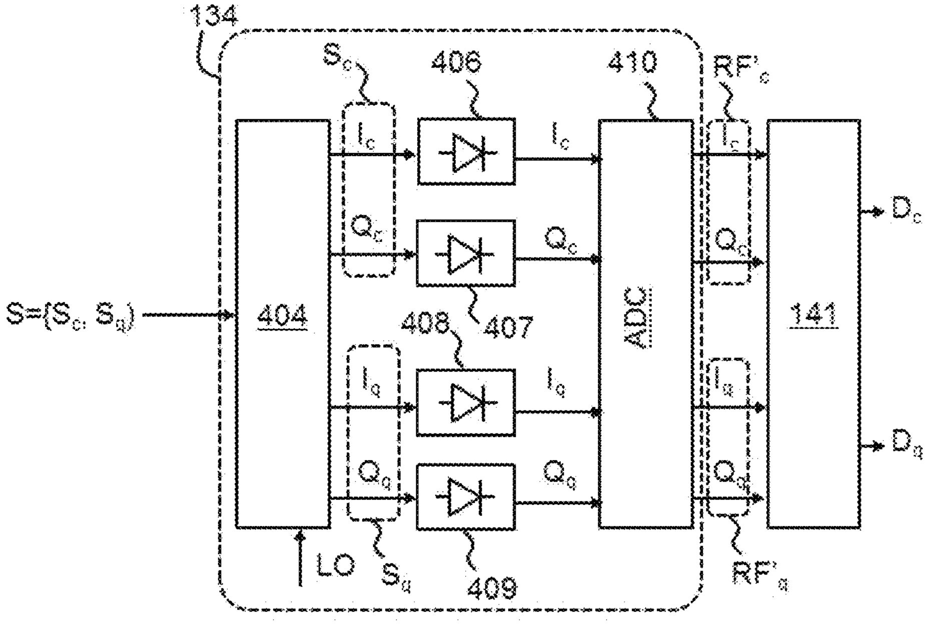
FIG. 4 depicts an embodiment of a receiver of the optical communication system of FIG. 1.

As illustrated on FIG. 4, the receiver 130 may further comprise the digital processing module 141 for implementing the processing units 139$_q$, 139$_c$ as shown in FIG. 1.

Figure 5:
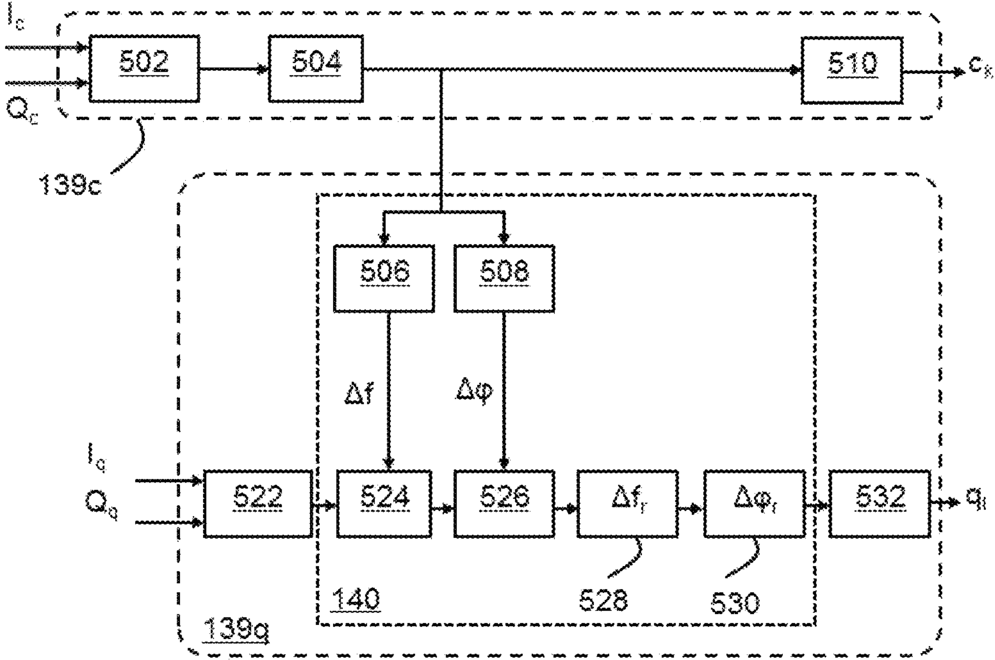
FIG. 5 depicts an embodiment of a signal processing module of the receiver of FIG. 4.

Referring to FIG. 5, an example of processing units 139$_q$, 139$_c$ will now be described.

For decoding the classical signal $RF'_c$, the processing unit 139$_c$ first comprises, for example, a frequency offset module 502 for compensating the frequency offset $f_s$, for instance in the classical signal $RF'_c$, that is to say to make the classical and quantum signals $RF'_c$, $RF'_q$ have approximately the same carrier frequency.

The processing unit 139$_c$ further comprises an equalizer module 504 for providing at least one equalized sample for each symbol period. For example, the equalizer module 504 is configured to perform an adaptive equalization based on a constant modulus algorithm (CMA) operated in Single-Input Single-output (SISO) mode. The equalizer module 504 may be configured to suppress Inter-Symbol Interference (ISI) induced by imperfect electronic and/or optoelectronic components used in the communication system (e.g. photodetectors, filters, etc.).

The processing unit 139$_c$ further comprises a decoder 510 configured, for each symbol period, for selecting, in the modulation alphabet $A_c$, the symbol $c_k$ that the equalized sample(s) match.

Turning to the decoding of the quantum signal $RF'_q$, the processing unit 139$_q$ first comprises, for example, a decision sampling module 522 configured for selecting, for each symbol period, an optimal sample amongst the samples of the signal $RF'_q$ during this symbol period.

In order to allow compensation of the frequency mismatch Δf between the optical carrier OC and the local oscillator wave LO, the compensator 140 further comprises a carrier frequency estimation (CFE) module 506 configured for analyzing the signal $RF'_c$, after compensation of the frequency offset $f_s$.

Conventional algorithms may be implemented by the CFE module 506 according to the type of modulation used (e.g. m-PSK, m-QAM). For example using, in particular when using the QPSK modulation (m=4), the CFE module 506 is configured for implementing the Viterbi & Viterbi $4^{th}$-power algorithm, preferably in the frequency domain, in order to estimate the frequency of the optical carrier OC that carries the received classical signal $S_c$, and thus the frequency mismatch Δf. For that purpose, the CFE module 506 is configured for raising the extracted signal $RF'_c$ to the power of 4, then filtering it out to suppress therefrom the components having a phase equal to $4\times(k\cdot\pi/2)$, where k is an integer, so as to remove any phase modulation. The remaining component has a single frequency equal to 4.Δf, where Δf is the frequency mismatch.

The compensator 140 further comprises a frequency correction module 524 configured for applying the frequency mismatch $\Delta f$ to the extracted quantum signal $RF'_q$, in particular from the frequency mismatch $\Delta f$ estimation carried out by the CFE module 506 on the classical signal $RF'_c$. For instance, compensation of this frequency mismatch is obtained by multiplying the quantum signal $RF'_q$ by $\exp(-i.2\pi.\Delta f.t)$.

In order to allow compensation of the phase mismatch $\Delta\varphi$ between the optical carrier OC and the local oscillator wave LO, the compensator 140 further comprises a carrier phase estimation (CPE) module 508 configured for analyzing the classical signal $RF'_c$, after compensation of the frequency offset $f_s$.

For example, the CPE module 508 is configured for estimating the phase of the signal $RF'_c$. In fact, since the signal $RF'_c$ originates from the optical carrier OC, it shares with the optical carrier OC the same instantaneous phase. Thus, estimating the phase of the received classical signal $RF'_c$ is equivalent to estimating the phase of the optical carrier OC.

Conventional algorithms may be implemented by the CPE module 508 according to the type of modulation used (e.g. m-PSK, m-QAM).

For example, in particular when using a QPSK modulation (m=4), the CPE module 508 is configured for implementing the Viterbi-Viterbi $4^{th}$ power algorithm, preferably in the time domain, in order to estimate the phase mismatch $\Delta\varphi$. According to this algorithm, the CPE module 508 is designed for raising the extracted signal $RF'_c$ to the power of 4, more specifically, calculating the $4^{th}$ power of each QPSK symbol to remove therefrom any phase modulation information. For each symbol, the phase is estimated by summing and averaging the computed $4^{th}$ power computed phase over a given time window or processing block that contains 20-50 symbols.

The Viterbi-Viterbi$_4{}^{th}$ power algorithm is well suited for mitigating the laser phase noise effectively, which is particularly beneficial to Quantum Key Distribution. Besides, this algorithm is sufficiently fast to enable real-time implementation of high-speed coherent optical fiber transmissions, in particular when using QPSK modulation (i.e. 4-PSK).

More generally, the Viterbi-Viterbi $m^{th}$ power algorithm may be used for higher phase modulation formats, such as m-PSK (with $m \in \{8, 16, 32, 64, 256, 1024, \ldots)$ to enable higher transmission speeds. In that case, the symbols of the extracted signal $RF'_c$ are raised to the power of m to remove the information of the modulated phase and compute therefrom the estimated carrier phase.

A different algorithm is provided for m-QAM transmissions, wherein $m \in \{4, 8, 16, 32, 64, 256, 1024, \ldots\}$. For instance, for 16-QAM or 64-QAM transmissions, a blind search algorithm may be implemented to select the phase mismatch $\Delta\varphi$ that minimizes the detection error at the receiver 130.

Probabilistic m-QAM transmissions may also be applied so that the distribution of symbols approximate a Gaussian distribution with a better matching than for conventional m-QAM transmission.

The compensator 140 further comprises a phase correction module 526 configured for compensating the phase mismatch $\Delta\varphi$ in the signal $RF'_q$, in particular from the phase mismatch $\Delta\varphi$ estimated by the CPE module 508.

According to the present disclosure, the inventors have shown that it is possible to apply existing algorithms for compensating the frequency and/or phase mismatch as described above to a classical data-carrying signal rather than to one or two pilot tones as described by Laudenbach et al., In particular, the inventors have demonstrated that a classical data-carrying signal can provide solid estimates of the frequency and/or phase of the quantum signal, without inducing excess noise beyond the null key rate threshold.

The inventors have shown that even in the presence of data, frequency and phase mismatch can still be estimated in a reliable manner from the classical signal for a quantum signal which requires a much higher precision than a classical signal. This is particularly surprising given that the data carried on the classical signal do not have a stable and predefined structure or properties which is apriori not suitable for estimating frequency and phase noise of a quantum signal with high precision.

Starting from the disclosure of Laudenbach et al., the inventors could not simply replace the pilot tone by a classical signal modulated at high speed to avoid degrading the transmission performance of the system, given that the pilot tone is spectrally separated from the optical carrier by 1 GHz only, which greatly reduces the modulation rate of the classical signal.

In that regard, the inventors have proposed a specific spectral arrangement, wherein the classical signal $S_c$ and the quantum signal $S_q$ are spectrally located on a same side of the optical carrier OC, such that they are spectrally separated not only from each other but also from the optical carrier OC, even though the optical carrier may be partially suppressed.

After compensating for the frequency mismatch $\Delta f$ as described above, a residual frequency mismatch $\Delta f_r$ may still be present due to a fluctuation of the frequency offset $f_s$ between the signals $RF'_c$, $RF'_q$. This fluctuation may result from the clock time jitter between the DAC of the signal generators $\mathbf{114}_c$, $\mathbf{114}_q$ of the transmitter 110 and the ADC 410 of the receiver 130.

Accordingly, the compensator 140 may further comprise a residual frequency correction module 528, which will be described in further details in reference to FIG. 9.

After compensating for the phase mismatch $\Delta\varphi$ as described above, a constant residual phase mismatch $\Delta\varphi_r$ may still be present between the quantum and the classical signals $RF'_q$, $RF'_c$ respectively. This residual phase mismatch $\Delta\varphi_r$ may result from different optical paths followed by the two respective optical polarizations of the optical signals $S_q$, $S_c$ inside the demodulation unit 134.

Accordingly, the compensator 140 may further comprise a residual phase correction module 530, which will be described in further details in reference to FIG. 9.

The processing unit $\mathbf{139}_q$ further comprises a decoder 532 configured for selecting, for each symbol period, in the modulation alphabet $A_q$, the symbol $q_l$ that the selected optimal sample(s) match.

Figure 6:
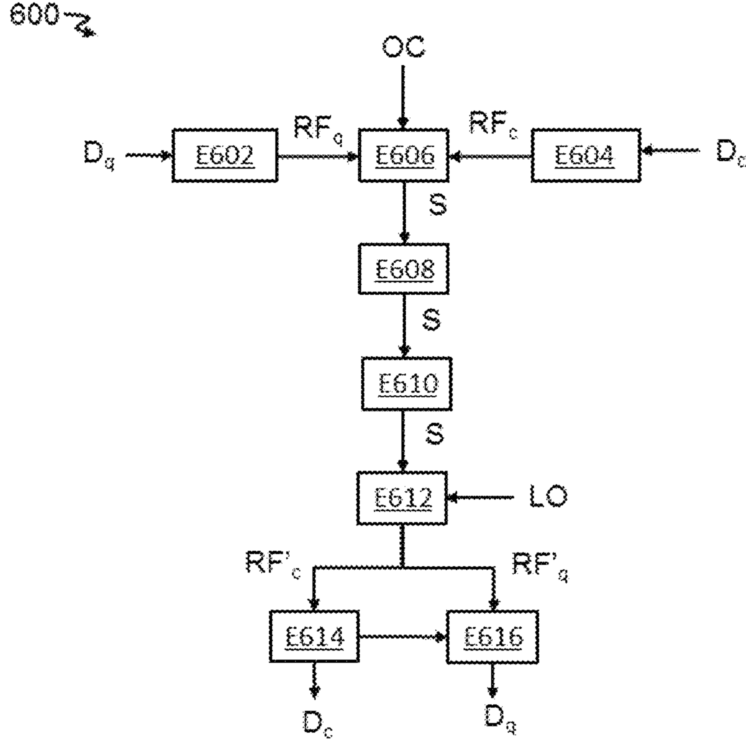
FIG. 6 depicts a method of coherent optical communication according to the disclosure.

An example of method 600 of optical communication, carried out by the system 100 of FIG. 1, will now be described in reference to FIG. 6.

In step E602, the signal generator $\mathbf{114}_q$ encodes the data $D_q$ in the first electrical signal $RF_q$.

In step E604, the signal generator $\mathbf{114}_c$ encodes the data $D_c$ in the second electrical signal $RF_c$.

In step E606, the modulation unit 116 modulates the optical carrier OC by the first electrical signal $RF_q$, and by the second signal $RF_c$ to obtain the optical dual signal S.

In step E608, the optical output 118 transmits the optical dual signal S to the optical propagation medium 120.

In step E610, after propagation in the optical propagation medium 120, the optical input 132 receives the optical dual signal S.

In step E612, the demodulation unit 134 extracts the signals $RF'_q$, $RF'_c$ from the received optical dual signal S, through coherent detection by means of the local oscillator wave LO.

In step E614, the extracted signal $RF'_c$ is processed to obtain the data $D_c$, as will be described in reference to FIG. 7.

In step E616, the extracted signal $RF'_q$ is processed to obtain the data $D_q$, as will be described in reference to FIG. 8.

Figure 7:
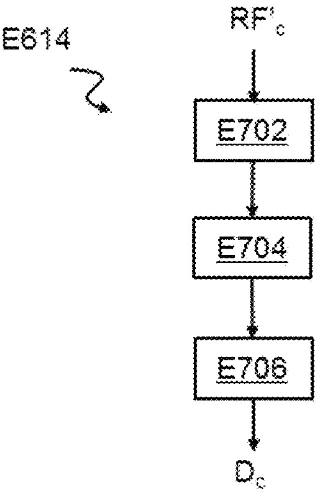
FIG. 7 depicts a first signal processing step of the method of FIG. 6.

Referring to FIG. 7, the step E614 comprises the following steps.

In step E702, the frequency offset module 502 compensates for the frequency offset $f_s$. As a result of step E702, both signals $RF'_c$, $RF'_q$ are substantially centered on the same frequency.

In step E704, the equalization module 504 equalizes the signal $RF'_c$. For instance, this equalization is adapted to mitigate inter-symbol interference (ISI) that may arise from the dispersive nature of the optical propagation medium 120.

In step E706, the decoder 510 detects the symbols $\{c_k\}$contained in the equalized signal $RF'_c$, in order to provide the data $D_c$. For instance, the decoder 510 detects the classical symbols based on hard decision decoding.

Figure 8:
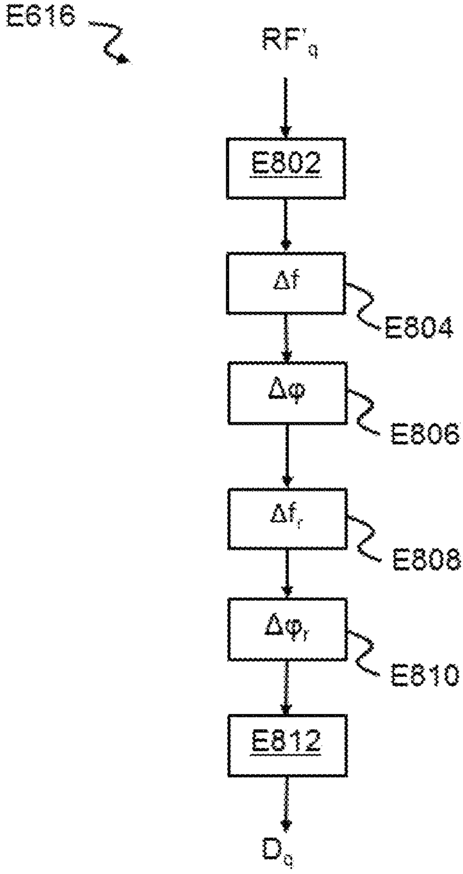
FIG. 8 depicts a second signal processing step of the method of FIG. 6.

Referring to FIG. 8, the step E616 comprises the following steps.

In step E802, for each symbol period, the decision sampling module 522 selects an optimal sample from the samples of the symbol period.

For example, the optimal sample is determined by the decision sampling module 522 in a prior calibration step, wherein reference symbols are sent by the transmitter 100 to the receiver 130 on the quantum channel at a high power, which is sufficiently high so that the signal comprising these reference symbols cannot be considered to be quantum. During each symbol period, the receiver generates a fixed number of samples N. The decision sampling module 522 determines a position n of the sample (or equivalently a time of the sample within the symbol period) that maximizes the power at the output of the equalizer module 504 with a high signal-to-noise ratio (SNR). This sample is referred to as the optimal sample which is identified for instance by the integer n comprised between 1 and N. Once the position of the optimal sample has been identified (or equivalently the time within the symbol period), the power on the quantum channel is reduced back to its nominal power as described above in reference to FIG. 2.

In step E804, the compensator 140 corrects the frequency of the signal $RF'_q$. Preferably, the CFE module 506 analyses the classical signal $RF'_c$, for instance after equalization at step E704, in order to estimate the frequency mismatch $\Delta f$ and the frequency correction module 524 compensates, in the signal $RF'_q$, the estimated frequency mismatch $\Delta f$.

In step E806, the compensator 140 corrects the phase of the signal $RF'_q$. Preferably, the CPE module 508 analyses the signal $RF'_c$, for instance after equalization at step E704, in order to estimate the phase mismatch $\Delta\varphi$, preferably for each symbol period and the phase correction module 526 compensates, in the signal $RF'_q$, the estimated phase mismatch $\Delta\varphi$.

In step E808, the compensator 140 further corrects the frequency of the signal $RF'_q$. Preferably, the residual frequency correction module 528 applies a residual frequency correction $\Delta f_r$ to the compensated signal $RF'_q$, as will be described in further details in reference to FIG. 9.

In step E810, the compensator 140 further corrects the phase of the signal $RF'_q$. Preferably, the residual phase correction module 530 applies a residual phase correction to the previously corrected $RF'_q$ provided at the output of the residual frequency module 528. For example, the residual phase mismatch $\Delta\varphi_r$ may be determined with a similar technique as the one implemented in step E808, as will be described in further details in reference to FIG. 9.

In step E812, the decoder 532 detects the symbols $q_l$ contained in the successively compensated signal $RF'_q$ as described above, in order to provide the data $D_q$.

Figure 9:
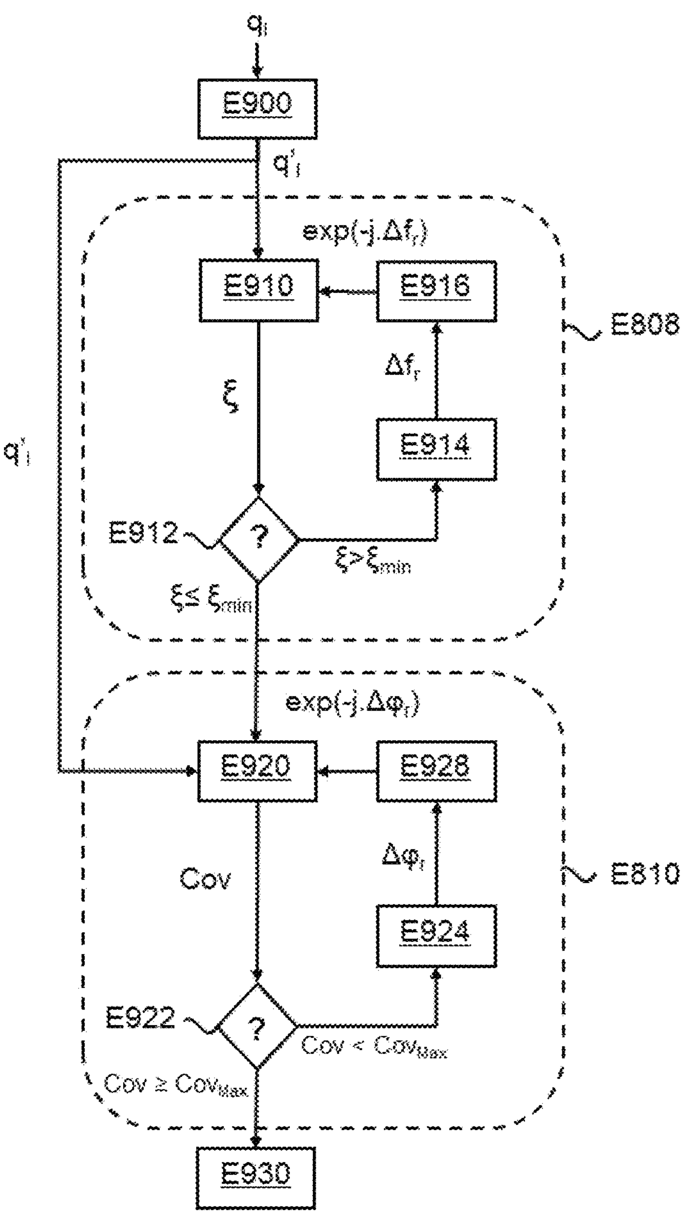
FIG. 9 depicts sub-steps of the second signal processing step of FIG. 8.

Referring to FIG. 9, an example of the residual frequency correction according to step E808 and an example of the residual phase correction according to step E810 will now be described in further details.

In a preliminary step E900, a sequence of symbols $q'_l$ is selected by the transmitter 110 from the symbols $q_l$ encoding the quantum data (i.e. quantum symbols) and this sequence of symbols $q'_l$ is sent to the receiver 130, preferably in parallel to the optical quantum signal $S_q$.

For instance, these symbols $q'_l$ are transmitted over a reconciliation channel between the transmitter 110 and the receiver 130. The reconciliation channel is a communication channel distinct from the quantum channel over which the quantum symbols $q_l$ are transmitted. For instance, the reconciliation channel may be the classical channel used to transmit the classical data De as described previously.

The residual frequency correction according to step E808 may then comprise the following steps.

In step E910, the residual frequency correction module 528 compares the quantum symbols $q'_q$ received from the reconciliation channel to the quantum symbols $q_q$ received from the quantum channel and the receiver 130 deduces therefrom the excess noise on the quantum channel.

Then, based on the calculated excess noise, the residual frequency correction module 528 corrects the frequency of the quantum signal $RF'_q$ by applying thereto the residual frequency mismatch $\Delta f_r$ in order to minimize the excess noise $\xi$ on the quantum channel. Preferably, this correction is performed in an iterative manner, i.e. by applying to the quantum symbols $q_l$ an incremental frequency correction until the excess noise $\xi$ is minimal.

In step E912, the residual frequency correction module 528 verifies if the excess noise $\xi$ calculated in step E910 is minimal, for instance if it is strictly greater than a predetermined value $\xi_{min}$.

In that case, in step E914, the residual frequency correction module 528 adjusts the residual frequency mismatch $\Delta f_r$ by a predefined offset, e.g. 5 Hz (for example, by adding this predefined offset to the residual frequency mismatch $\Delta f_r$ or subtracting this predefined offset from the residual frequency mismatch $\Delta f_r$).

In step E916, the residual frequency correction module 528 compensates the updated residual frequency mismatch $\Delta f_r$ in the decoded quantum symbols $q_l$, for instance by multiplying the symbols extracted on the quantum channel by $\exp(-j.\Delta f_r)$.

After compensation, the excess noise $\xi$ is calculated in step E910 as described previously but using the compensated quantum symbols.

The steps E910, E912, E914, E916 are repeated by the residual frequency correction module 528 until the compensated quantum symbol constellation no longer rotates, which is equivalent to reaching a minimal level of excess noise. At each iteration, if the excess noise $\xi$ is not minimal, the residual frequency offset is compensated incrementally on the quantum symbols until the excess noise reaches the minimal value $\xi_{min}$. Thus, the excess noise $\xi$ is a convergence criteria for determining the residual frequency mistmatch $\Delta f_r$.

Once the minimal excess noise is obtained ($\xi \leq \xi_{min}$), the step E810 is executed according to the followings steps, for instance by the residual phase correction module 530.

In step E920, the residual phase compensation module 530 compares the reference quantum symbols $q'_I$ received from the reconciliation channel to the quantum symbols $q_I$ received from the quantum channel and deduces therefrom the covariance Cov between the reference quantum symbols $q'_I$ on the reconciliation channel and the quantum symbols $q_I$ on the quantum channel.

Then, based on the calculated covariance Cov, the residual phase compensation module 530 corrects the phase of the quantum signal $RF'_q$ by applying thereto the determined residual phase mismatch $\Delta\varphi_r$.

The residual phase mismatch $\Delta\varphi_r$ is determined iteratively by applying incremental phase changes to the quantum signal $RF'_q$ in order to maximize the covariance of the quantum symbols $q_I$ received on the quantum channel and the reference symbols $q'_I$ received on the reconciliation channel.

At each iteration, residual phase compensation module 530, in step E922, whether this covariance Cov is maximal, e.g. if it is strictly less than a predetermined value $Cov_{Max}$. In that case, residual phase compensation module 530 updates, in step E924, the residual phase mismatch $\Delta\varphi_r$, for instance by adding thereto (or subtracting therefrom) a predetermined incremental phase offset.

Then, residual phase compensation module 530 applies the updated residual phase mismatch to the quantum symbols in step E928.

The steps E920, E922, E924, E928 are repeated by the residual phase correction module 530, as long as the covariance is not maximal. The process stops in step E930 when the covariance has reached the maximal covariance designated by the value $Cov_{Max}$. Thus, according to this iterative process, the covariance is a convergence criteria for correcting the residual phase mismatch $\Delta\varphi_r$.

The residual phase mismatch $\Delta\varphi_r$ varies very slowly and may be considered constant over the measurement period during which the data are acquired. Therefore, for each measurement period, a search over values of the residual phase mismatch $\Delta\varphi_r$ within the interval $[0, 2\pi]$ allows to determine the optimum value of the residual phase difference that maximizes the transmission performances (i.e. minimizes the bit error rate).

According to the present disclosure, the inventors have shown that a fine correction of the residual frequency and/or phase mismatch can be performed by comparing reference data sent in a high power regime with quantum data sent on the quantum channel, without requiring dedicated pilot tones.

The inventors demonstrated experimentally that in case of QPSK modulated signals, the residual frequency correction enables to precisely bring the quantum channel in phase with the classical channel with an instantaneous phase error of less than 0.2 Rad. As a result, the decoded symbol constellation was clearly divided into four scatter plots fully contained within their respective quadrant with low scattering of the symbols in each quadrant.

The invention claimed is:

1. An optical communication method via an optical propagation medium, comprising modulating an optical carrier by both a first electrical signal and a second electrical signal, in order to provide an optical dual signal comprising an optical quantum signal resulting from the modulation of the optical carrier by the first electrical signal and an optical classical signal resulting from the modulation of the optical carrier by the second signal, first data being encoded in the first electrical signal;

transmitting the dual optical signal on the optical propagation medium;

receiving the dual optical signal from the optical propagation medium (120);

extracting the first electrical signal and the second electrical signal ($RF_c$) from the received dual signal using a coherent receiver comprising a local oscillator;

compensating in the extracted first signal and from the extracted second signal a frequency mismatch between a central frequency of the optical quantum signal and a local oscillator optical wave provided by the local oscillator; and/or a phase mismatch between the optical carrier and the local oscillator wave; and decoding the first data from the compensated first signal;

wherein second data are encoded in the electrical second signal and wherein the method further comprises:

decoding the second data from the extracted second signal.

2. The method according to claim 1, wherein the modulation step further comprises polarization multiplexing, so that the optical quantum signal and the optical classical signal have orthogonal polarizations relative to each other.

3. The method according to claim 1, wherein the modulation step comprises:

modulating the optical carrier by both the first electrical signal and the second electrical signal, in order to provide an intermediate optical signal (S') comprising a classical signal resulting from the modulation of the optical carrier by the first electrical signal and comprising the classical signal resulting from the modulation of the optical carrier by the second electrical signal; and attenuating an optical power of the classical signal resulting from the modulation of the optical carrier by the first electrical signal ($RF_q$), in order to obtain the quantum signal.

4. The method according to claim 1, wherein the optical quantum signal and the optical classical signal are frequency multiplexed.

5. The method according to claim 4, wherein the first and second electrical signals have respective disjoint bandwidths.

6. The method according to claim 4, wherein the first and second electrical signals have respective central frequencies separated by a predetermined frequency offset, preferably greater than 2 GHZ.

7. The method according to claim 4, wherein the optical classical signal and the optical quantum signal are both spectrally arranged either below or above the optical carrier.

8. The method according to claim 6, comprising compensating the frequency offset before estimating (E710) the frequency mismatch and/or estimating the phase mismatch.

9. The method according to claim 1, wherein the first data and the second data are encoded by m-Quadrature Phase Shift Keying and wherein the phase mismatch and/or the frequency mismatch is determined by the Viterbi & Viterbi $m^{th}$ power algorithm, preferably wherein m=4.

10. The method according to claim 1, comprising:

before modulating the optical carrier, performing a digital-to-analogue conversion of the first electrical signal and the second electrical signal;

after extracting the first and second electrical signals from the received dual signal, performing an analogue-to-digital conversion of the extracted first signal and the extracted second signal; and compensating a residual frequency mismatch and/or a residual phase mismatch in the extracted first signal wherein the residual frequency mismatch results from a clock time jitter between the digital-to-analogue conversion and the analogue-to-digital conversion and wherein the phase mismatch results from an optical path difference between the classical signal and the quantum signal.

11. The method according to claim 10, comprising, prior to compensating the residual frequency mismatch and/or the residual phase mismatch, sending to the receiver a set of reference data selected from the first data separately from the quantum signal.

12. The method according to claim 11, wherein compensating the residual frequency mismatch comprises:

estimating an excess noise by comparing the received reference quantum data with the corresponding first data; and determining the residual frequency mismatch iteratively so that the excess noise is minimized.

13. The method according to claim 11, wherein compensating (E810) the residual phase mismatch comprises:

calculating a covariance between the decoded first data and the received reference quantum data; and determining the phase mismatch iteratively so that the covariance is maximized.

14. The method according to claim 11, wherein the second data contains the reference data, so that the reference data is sent from the emitter to the receiver along with the second data.

15. The method according to claim 1, wherein the optical propagation medium is a single-mode optical fiber.

16. A receiver for optical communication, comprising:

an optical input for receiving, from an optical propagation medium, a dual optical signal comprising an optical quantum signal resulting from a modulation of an optical carrier by a first electrical signal and a classical optical signal resulting from a modulation of the optical carrier by a second electrical signal, first data being encoded in the first electrical signal;

a coherent demodulation unit and a local oscillator for extracting the first and second electrical signals from the received dual signal;

a compensator for compensating, in the extracted first electrical signal and from the extracted second electrical signal:

a frequency mismatch between a central frequency of the optical quantum signal and a local oscillator optical wave provided by the local oscillator; and/or a phase mismatch between the optical carrier and the local oscillator wave; and a first processing unit for processing the compensated first signal to obtain the first data;

wherein second data are encoded in the second signal and in that it further comprises a second processing unit for processing the extracted second signal to provide the second data.

17. A system for optical communication, comprising:

a transmitter, a receiver according to claim 16; and an optical propagation medium connecting the transmitter to the receiver.

18. A system according to claim 17, wherein the optical propagation medium is a single-mode optical fiber.

* * * * *